United States Patent [19]
Suzuoki

[11] Patent Number: 6,071,193
[45] Date of Patent: Jun. 6, 2000

[54] METHOD AND APPARATUS FOR TRANSMITTING PICTURE DATA, PROCESSING PICTURES AND RECORDING MEDIUM THEREFOR

[75] Inventor: Masakazu Suzuoki, Tokyo, Japan

[73] Assignee: Sony Computer Entertaintaiment Inc., Tokyo, Japan

[21] Appl. No.: 08/932,226

[22] Filed: Sep. 17, 1997

[30] Foreign Application Priority Data

Sep. 20, 1996 [JP] Japan ..................................... 8-271909

[51] Int. Cl.[7] ..................................................... A63F 9/22

[52] U.S. Cl. ............................ 463/31; 345/431; 382/248

[58] Field of Search ..................................... 382/232, 233, 382/237, 243; 345/202, 430–434; 463/30, 31, 33

[56] References Cited

U.S. PATENT DOCUMENTS

| | | | |
|---|---|---|---|
| 5,568,167 | 10/1996 | Galbi et al. | 348/589 |
| 5,892,518 | 4/1999 | Mizobata et al. | 345/431 |
| 5,915,046 | 6/1999 | Echigo et al. | 382/248 |

*Primary Examiner*—Jessica J. Harrison
*Attorney, Agent, or Firm*—Fulwider Patton Lee & Utecht, LLP

[57] ABSTRACT

A data processing system wherein picture data in which there is allocated a value representing transparency as a pixel value is transmitted after being compressed in terms of picture data corresponding to a pre-set pre-determined size of a picture area as a unit. Ancillary data specifying whether each pixel of the original picture data of the picture data unit is transparent or opaque is transmitted in correlation with the compressed picture data as the unit. On expansion of the compressed picture data, a pixel set as a transparent pixel by the ancillary data is compulsorily set as a transparent pixel without regard to the expanded picture data.

22 Claims, 15 Drawing Sheets

| | | | | | | | | | | | | | | | |
|---|---|---|---|---|---|---|---|---|---|---|---|---|---|---|---|
| 0 | 0 | 0 | 0 | 0 | 0 | 1 | 1 | 1 | 1 | 0 | 0 | 0 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 1 | 1 | 1 | 1 | 1 | 1 | 1 | 1 | 1 | 1 | 0 | 0 | 0 |
| 0 | 0 | 1 | 1 | 1 | 1 | 1 | 1 | 1 | 1 | 1 | 1 | 1 | 1 | 0 | 0 |
| 0 | 1 | 1 | 1 | 1 | 1 | 1 | 1 | 1 | 1 | 1 | 1 | 1 | 1 | 1 | 0 |
| 0 | 1 | 1 | 1 | 1 | 1 | 1 | 1 | 1 | 1 | 1 | 1 | 1 | 1 | 1 | 0 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 |
| 0 | 1 | 1 | 1 | 1 | 1 | 1 | 1 | 1 | 1 | 1 | 1 | 1 | 1 | 1 | 0 |
| 0 | 1 | 1 | 1 | 1 | 1 | 1 | 1 | 1 | 1 | 1 | 1 | 1 | 1 | 1 | 0 |
| 0 | 0 | 1 | 1 | 1 | 1 | 1 | 1 | 1 | 1 | 1 | 1 | 1 | 1 | 0 | 0 |
| 0 | 0 | 0 | 1 | 1 | 1 | 1 | 1 | 1 | 1 | 1 | 1 | 1 | 0 | 0 | 0 |
| 0 | 0 | 0 | 0 | 1 | 1 | 1 | 1 | 1 | 1 | 1 | 1 | 0 | 0 | 0 | 0 |
| 0 | 0 | 0 | 0 | 0 | 0 | 1 | 1 | 1 | 1 | 0 | 0 | 0 | 0 | 0 | 0 |

FIG.10

CLUT

| INDEX (COLOR NUMBER, 4 BITS) | REPRESENTATIVE COLOR DATA (24 BITS OF R,G AND B IN TOTAL) |
|---|---|
| 0 BITS | COLOR DATA 0 |
| 1 BITS | COLOR DATA 1 |
| 2 BITS | COLOR DATA 2 |
| ⋮ | ⋮ |
| 15 BITS | COLOR DATA 15 |

FIG.11

METHOD AND APPARATUS FOR TRANSMITTING PICTURE DATA, PROCESSING PICTURES AND RECORDING MEDIUM THEREFOR

This application claims priority under the International Convention based upon Japanese Patent Application No. P08-271909, filed Sep. 20, 1996.

BACKGROUND OF THE INVENTION

1. Field of the Invention

This invention relates generally to a new and improved method and apparatus for picture data transmission, picture processing and a recording medium and, more particularly, to a new and improved system for real-time display of a three-dimensional object responsive to a user input or processing results achieving moderate precision, with the use of relatively limited hardware resources, such as a video game machine or a personal computer whereby greater efficiency at lower cost is accomplished.

2. Description of the Related Art

In a typical TV game machine for household use, a personal computer or a graphics computer, a picture processing device designed for generating picture data outputted to a TV receiver or a monitor receiving data for display, is made up of a general-purpose memory, a CPU and other processing LSIs, interconnected over a bus. A dedicated picture drawing device is provided between the CPU and a frame buffer looking in the direction of the flow of picture data for drawing to facilitate high-speed processing.

In the aforedescribed system, the CPU does not have direct address to a frame buffer as a display memory associated with a display screen. Instead, the CPU performs geometry processing, such as coordinate transformation, clipping or light source calculations, for defining a three-dimensional model as a combination of basic unit figures (polygons) such as triangles or quadrangles, to produce a command for drawing a three-dimensional picture. The CPU sends the picture drawing command over an external bus to a suitable drawing device.

The drawing command includes information such as the shape, position, direction, color or the pattern of the polygon to be drawn. The shape, position or the direction of the polygon is determined by the coordinates of the polygon apex points.

For displaying a three-dimensional object, the object is first analyzed into plural polygons. The CPU produces a drawing command for each of these polygons. The drawing commands so generated are then transmitted over a bus to a picture drawing device which executes the drawing commands in order to write display data in the frame buffer for displaying the targeted three-dimensional object.

For representing the object more realistically, a technique known as a texture mapping or mip mapping is used, in which a pre-set picture pattern is readied and the inside of the polygon is modified using the picture pattern.

There is also a well-known technique of varying the display color by converting the color data of a picture through a color lookup table (CLUT) having color lookup data recorded thereon.

In the TV game machine for domestic use or a processing LSI making up a personal computer, attempts have been made to improve performance by speeding up the operating frequency or reducing the circuit scale without increasing the cost. However, the usual capacity of a low cost general-purpose memory is not increased significantly by incoming speed of operation. Hence, in a TV game machine for household use, or in a personal computer, the memory capacity proves to be a bottleneck.

In particular, for texture mapping using a high-quality picture prepared in advance in a high-quality work station (pre-rendering pattern) as a texture pattern, it is necessary to hold all patterns making up a segment of a moving picture in a memory. However, in this case, the higher the resolution of the texture pattern, the more significantly the available memory capacity is curtailed.

Consequently, a method is employed for holding the texture pattern in a compressed form in a memory and reading out the data of the compressed texture pattern each time the data is used and of expanding (de-freezing) the compressed data using a dedicated picture expansion device.

By way of example, a typical texture pattern is made up of picture data of a picture area dimensioned 64 vertical pixels by 64 horizontal pixels. However, since the texture pattern is not necessarily rectangular in shape, pixels not drawn, that is transparent pixels, need to be set in the picture data of the rectangular picture area for representing the required texture pattern.

Thus, in the drawing device, a method is required for discriminating these non-drawn pixels in the data of the texture of the rectangular area. To this end, the information termed an $\alpha$-plane, of the same screen area for representing transparency is provided separately.

However, since the drawing device needs to perform processing for drawing using the $\alpha$-plane, the information on the $\alpha$-plane needs to be stored along with the texture picture data in the memory, thus necessitating increased memory capacity.

In order to avoid such increased memory capacity requirements, it has also been proposed to pre-set special values representing the transparency for each pixel value, such as $(R, G, B)=(0, 0, 0)$ in the case where the pixel values are represented by three prime colors of red (R), green (G) and blue (B). The drawing device then does not rewrite the value of the frame buffer if the pixel value is the above value for the display picture, the pixel in the texture picture being then transparent.

However, high-efficiency compression for picture data, such as texture picture data, is generally irreversible, such that transparent portions occasionally may be decoded as being opaque, in which case such opaque pixel portions are displayed as noise at the peripheral edge of the texture pattern.

On the other hand, in a system in which a special value is used as a pixel value for representing transparency, and an opaque pixel is suddenly changed to a non-drawn transparent pixel, a jagged noise, or so-called aliasing noise, is occasionally produced in an edge of a texture pattern when a texture pattern is displayed to a reduced scale or to an enlarged scale. This is similar to the phenomenon which occurs in case of unsatisfactory picture synthesis employing a blue background of a chroma key in television broadcasting.

Accordingly, there has been a long existing need for improved methods and apparatus for overcoming the aforedescribed problem in which a high-quality picture, such as a pre-rendered texture pattern, provided as a picture, is deteriorated when it is drawn for display. The present invention clearly fulfills this need.

SUMMARY OF THE INVENTION

Briefly, and in general terms, the present invention provides a new and improved method and apparatus for transmitting and processing image data, and a recording medium therefor, which obviates the aforedescribed problems of image noise and the handling of pixel transparency data.

By way of example, and not necessarily by way of limitation, the present invention provides a picture data transmission system for transmitting picture data in which a value is allocated representing transparency of a pixel, with the picture data being compressed in terms of picture data corresponding to a pre-set pre-determined size of a picture area as a unit, and transmitting ancillary data specifying whether each pixel of the original picture data of the picture data unit is transparent or opaque in correlation with the compressed picture data.

In accordance with the invention, a pixel set as a transparent pixel by the ancillary data on expansion of the compressed picture data is compulsorily set as a transparent pixel without regard to the expanded picture data.

With the picture data transmission method of the present invention, if a pixel which should be transparent becomes opaque by error on expansion and decoding of data-compressed picture data, such a pixel is compulsorily converted into a transparent pixel. The expanded picture data, thus corrected. is stored in the memory and used for drawing by a drawing device. Hence, it becomes unnecessary to store the ancillary data in a memory so that the memory capacity corresponding to the ancillary data may be eliminated. In addition, since the inherently transparent portion is always drawn as a transparent portion, the noise due to irreversible compression is reduced in the regenerated picture.

The present invention also provides a picture processing system in which a value representing transparency as a pixel value is allocated and drawing performed includes transparency, wherein an opaque pixel neighboring to the transparent pixel is drawn as a semi-transparent pixel.

With the picture processing apparatus of the present invention, a pixel neighboring to the transparent pixel is compulsorily converted into a semi-transparent pixel, whereby aliasing noise may be reduced.

Hence, the present invention satisfies a long existing need in the art for a method and apparatus for transmitting and processing image data, and a recording medium therefor, which obviates the aforedescribed problems of image noise and the handling of pixel transparency data.

These and other objects and advantages of the invention will become apparent from the following more detailed description, when taken in conjunction with the accompanying drawings of illustrative embodiments.

BRIEF DESCRIPTION OF THE DRAWINGS

FIG. 10 illustrates ancillary data annexed to the picture pattern of FIG. 12;

FIG. 11 illustrates a color conversion table for the index color form;

DETAILED DESCRIPTION OF THE PREFERRED EMBODIMENTS

Figure 1:
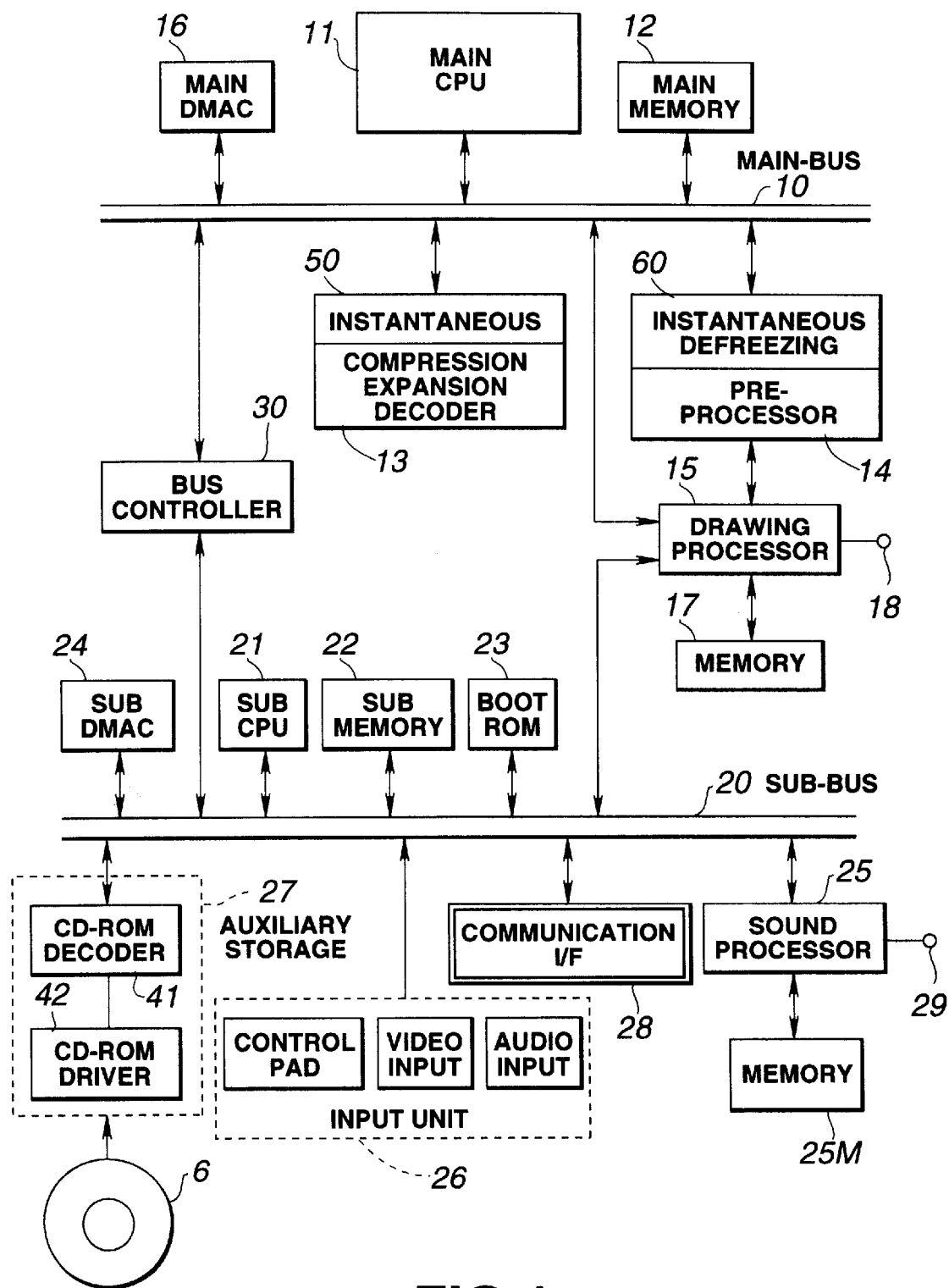
FIG. 1 is a block diagram illustrating a game machine embodying a picture processing device in accordance with the present invention.

Referring now to the drawings, like reference numerals denote like or corresponding parts throughout the drawing figures.

The present invention is explained, by way of example, in the context of a television game machine.

There is shown in FIG. 1 an embodiment of a television game machine having a three-dimensional graphics functions and a moving picture reproducing function in accordance with the present invention.

Figure 2:
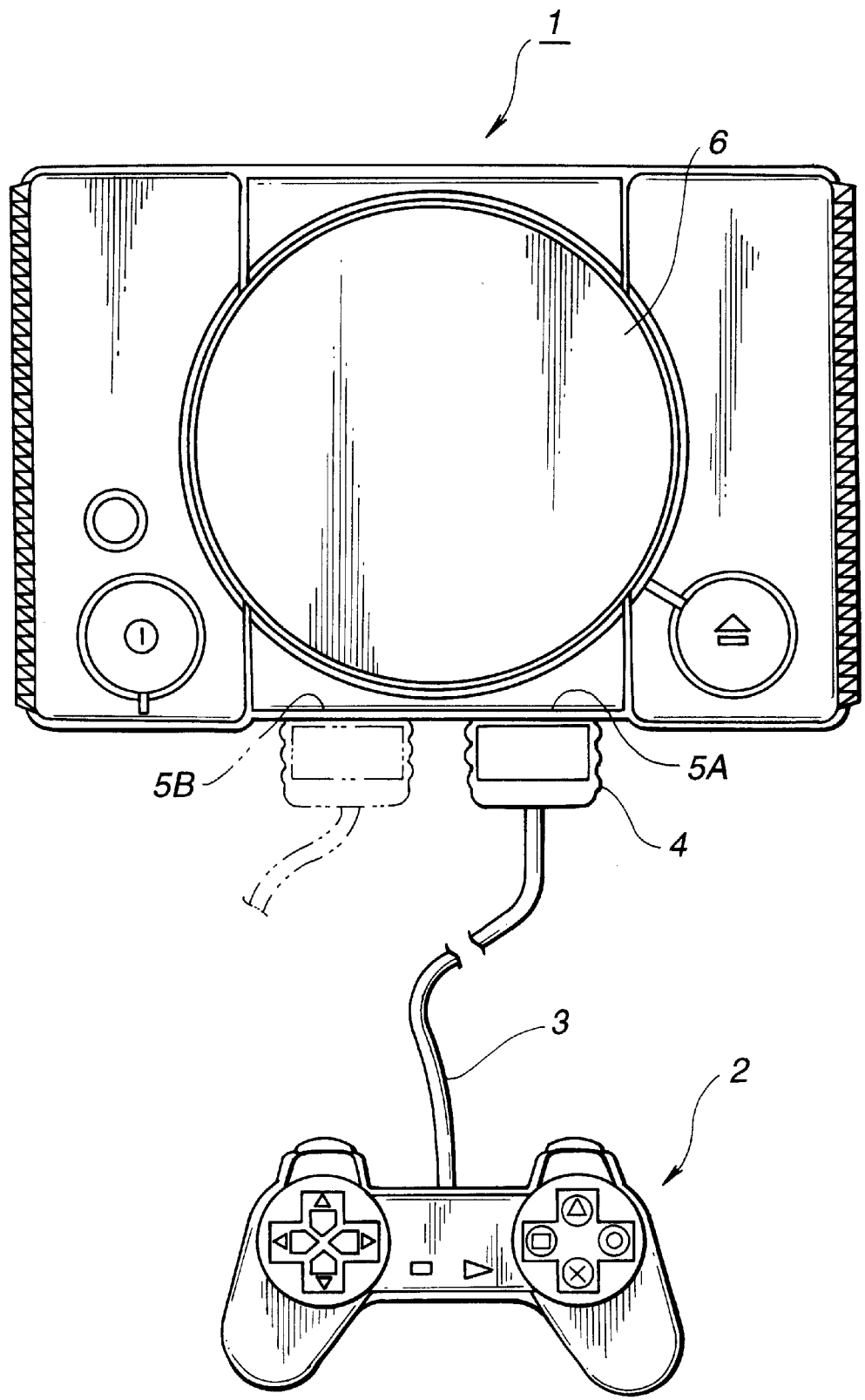
FIG. 2 shows external physical appearance of the game machine shown in FIG. 2.

In FIG. 2, there is shown a game machine 1 including a main body portion of the game machine and a control pad 2 constituting a user input portion. The control pad 2 is connected to the main body portion of the game machine 1 by interconnecting a connector plug 4 mounted on a foremost part of a cable 3 connected in turn to the control pad 2 and a connector jack 5A of the main body portion of the game machine 1. In the present embodiment, two connector jacks 5A, 5B are provided on the main body portion of the game machine 1 so that two control pads 2 will be connected to the main body portion of the game machine 1 for providing a game for opponents.

With this type of game machine, the game can be enjoyed by loading in the main body portion of the game machine 1 a subsidiary storage device, such as CD-ROM disc 6, having written thereon a game program or picture data.

Referring again to FIG. 1, the game machine of the present embodiment has two system buses, namely a main bus 10 and a sub-bus 2. Data exchange between the main bus 10 and the sub-bus 20 s controlled by a bus controller 30.

To the main bus 10 are connected a main CPU 11, a picture expansion decoder 13, a pre-processor 14, a drawing processor 15 and a main DMA controller 16. A processing memory 17 is connected to the drawing processor 15 including a frame buffer for display data frame memory) and a D/A converter. An analog video signal from the drawing processor 15 is outputted to a video output terminal 18. This video output terminal 18 is connected to a display device, such as CRT display, in a manner not shown.

To the sub-bus 10 are connected a sub-CPU 21, a sub-memory 22, a boot ROM 23, a sub-DMA controller 24, a processor 25 for sound processing, an input unit 26, a subsidiary storage device 27 and a communication interfacing unit 28 for system expansion. In the instant embodiment, the subsidiary storage device 27 includes a CD-ROM decoder 41 and a CD-ROM driver 42. In the boot ROM 23 is stored a program for starting the operation as the game machine. To the sound processor 25 is connected a memory 25M for sound processing. The sound processor 25 includes a D/A converter providing an analog sound signal which is outputted at a sound output terminal 29.

The subsidiary storage device 27 decodes an application program, such as a game program, and data, recorded on the CD-ROM disc 6 loaded on the CD-ROM driver 42. On the CD-ROM disc 6, there are also recorded picture data of a compressed moving picture or a still picture and picture data of the texture picture modifying the polygon. The application program of the CD-ROM disc 6 also includes a polygon drawing command.

The input unit 26 also includes a control pad 2 as the above-mentioned user input means, an input terminal for video signals and an input terminal for sound signals.

The main CPU 11 manages and controls various parts of the main bus side. The main CPU also performs part of the processing in case of drawing an object as a set of a large number of polygons. The main CPU 11 formulates on the main memory 12 a string of drawing commands for generating a drawing picture for one screen as will be explained subsequently. Data exchange between the main CPU 11 and the main bus 10 is on the data packet basis for enabling burst transfer.

The main memory 12 includes, for picture data of the moving picture and still picture, a memory area for compressed picture data and a memory area for expanded and decoded picture data. The main memory 12 also includes a memory area for graphics data, such as a drawing command string (termed a packet buffer). This packet buffer is used for setting a drawing command string by the CPU 11 and for transferring the drawing command string to the drawing processor. This packet buffer is used for setting the drawing command string by the main CPU 11 and for transferring the drawing command string to the drawing processor 15.

The picture expansion decoder 13 expands compressed moving picture data reproduced from the CD-ROM disc 6 and transferred to the main memory and compressed texture pattern data on the main memory 12. Since the picture compression system of MPEG2 is used in the instant embodiment, the picture expansion decoder 1 also has a corresponding decoder configuration, as also will be explained subsequently.

On an output stage of the picture expansion decoder 13, there is provided an instantaneous compression unit 50 capable of instantaneous (substantially real-time) compression/expansion and having a compression rate of, for example, ¼ to ½. The picture expansion decoder 13 can select, as an output form of its output picture data, a first output data form of re-quantizing the values of the pixels of the picture data and outputting the re-quantized pixel values or a second output data form of converting the pixels into index data specifying the colors proximate to the pixels from a pre-set number of limited playback colors, whichever is suited to the processing executed by the drawing processor 15. The first output data form or the second output data form are herein termed a direct color form and an index color form, respectively.

The drawing processor 15 executes the drawing command transferred from the main memory 12 for storing the results in the frame memory. The picture data read out from the frame memory are outputted via a D/A converter to a video output terminal 18 so as to be displayed on the screen of the picture monitor device.

If the output form of the picture data received from the main memory 12 is in the direct color form, the drawing processor 15 stores directly the re-quantized pixel values in the frame memory. If the output form of the picture data received from the main memory 12 is the index color form, the drawing processor 15 performs processing of converting the picture data into corresponding representative color data. To this end, the drawing processor 15 can store a color lookup table (CLUT) which is a conversion table between the index data and the representative color data.

The pre-processor 14 is constructed as a processor having the CPU and is designed for sharing a portion of the processing performed by the main CPU 11. For example, the pre-processor 14 can occasionally perform processing of converting the polygon data into two-dimensional coordinate data for display.

In the present embodiment, an instantaneous defreezing unit 60 is provided between the pre-processor 14 and the main bus 10 for de-freezing the compression realized by the instantaneous compressing unit 50.

The basic processing of the present game machine is next described.

If the power source is connected for the game machine shown in the embodiment of FIG. 1, and a CD-ROM disc 6 is loaded on the main body portion of the game machine 1, the sub-CPU 21 executes an initializing program for executing the program. The recording data of the CD-ROM disc 6 is then seized by the following process steps.

That is, in the subsidiary storage device 27, the compressed picture data, drawing command and the program to be executed by the main CPU 11 are read out from the CD-ROM disc 6 via CD-ROM driver 42 and CD-ROM decoder 41 so as to be temporarily loaded by the sub-DMA controller 24 in the sub-memory 22.

The data seized by the sub-memory 22 are transferred by the sub-DMA controller, bus-controller 30 and the main DMA controller 16 to the main memory 12. Meanwhile, the sub-CPU 21 is configured for directly accessing the frame of the drawing processor 15 so that the sub-CPU 21 also can modify the contents of the displayed picture independently of the control performed by the drawing processor 15.

Figure 3:
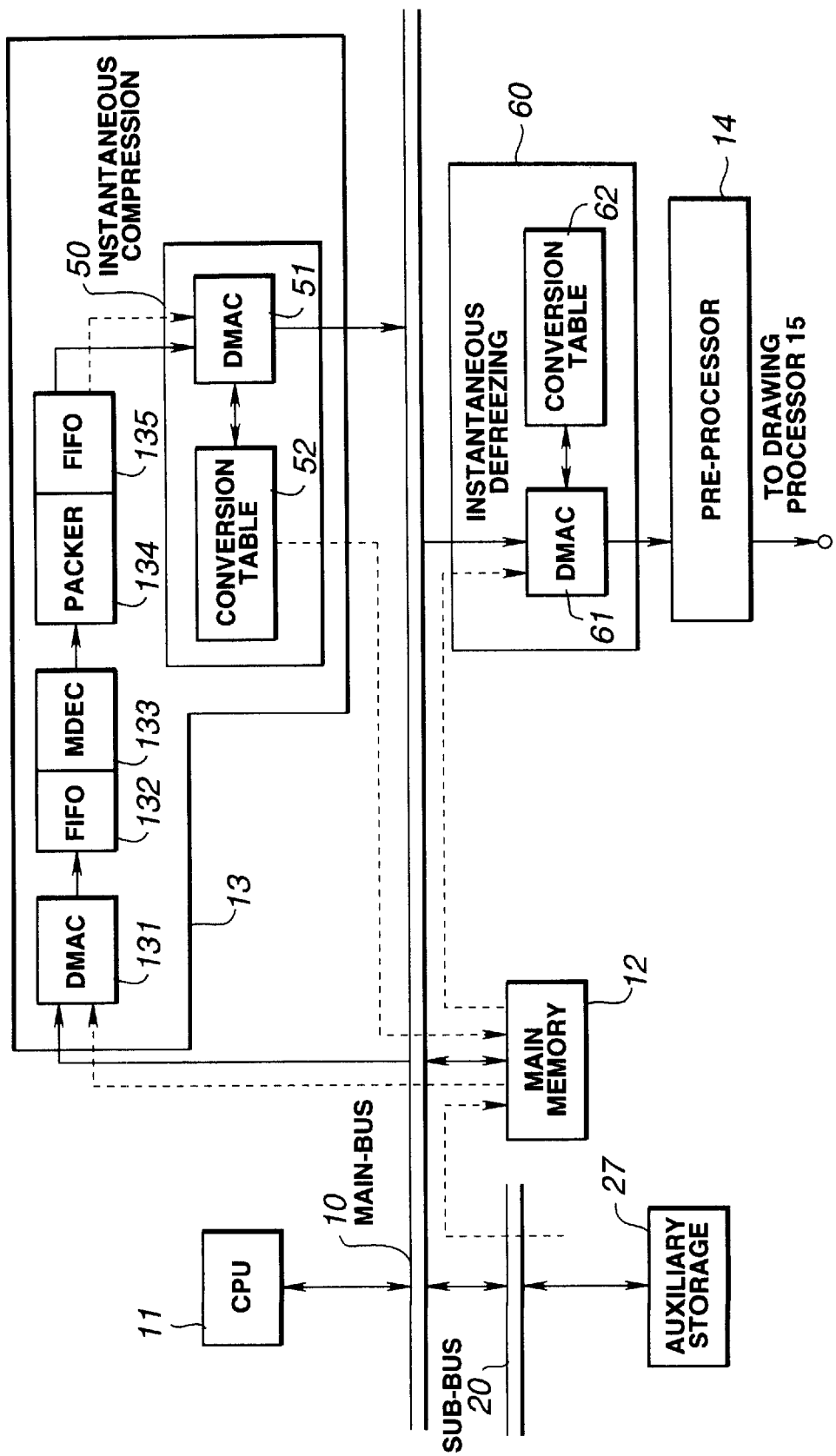
FIG. 3 illustrates a system for processing compressed picture data in accordance with the present invention.

FIG. 3 is a block view illustrating the flow of picture data in the block diagram of FIG. 1 in more detail. In FIG. 3, a dotted line arrow specifies the flow of picture data.

Figure 4:
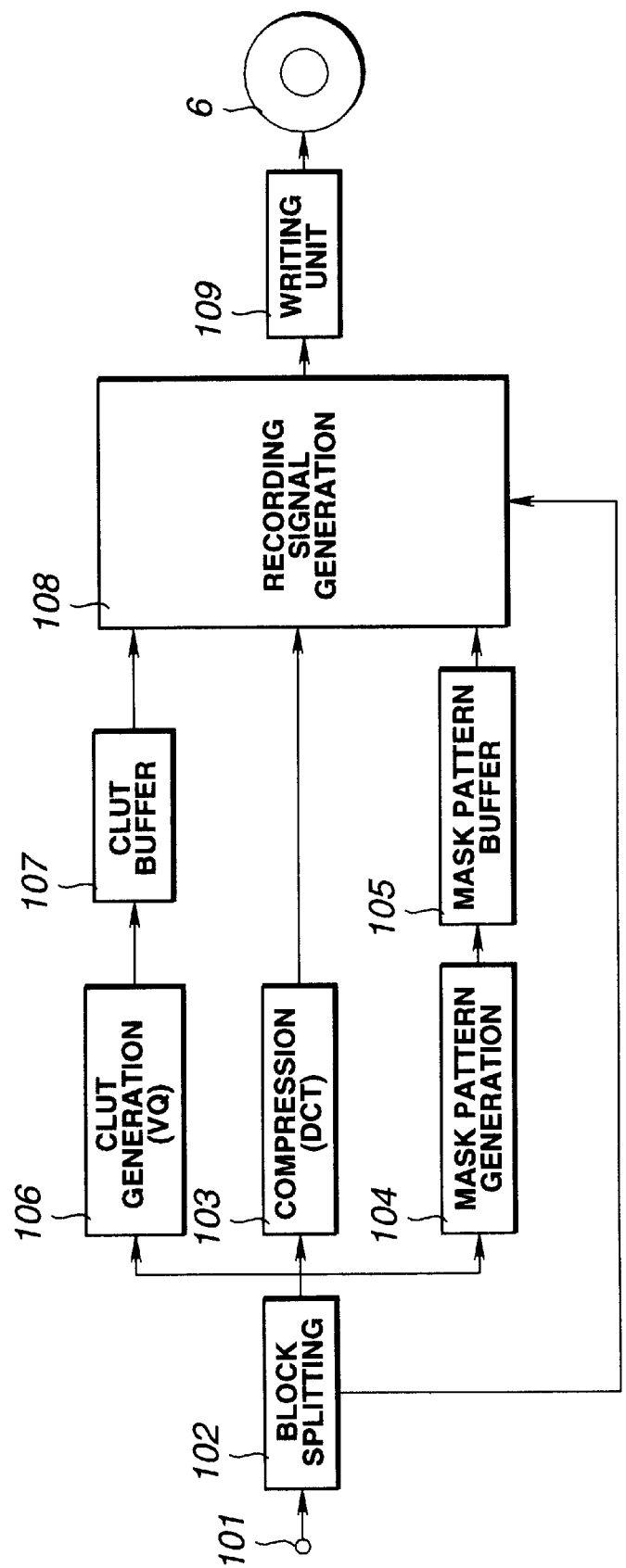
FIG. 4 is a block diagram for a recording processor in a picture data transmission system according to the present invention.

Referring now FIG. 4, the picture expansion decoding unit 13 of the present embodiment includes a DMA controller 131, a FIFO memory 132, a MPEG decoder (MDEC) 133, a packer 133, a FIFO memory 135 and an instantaneous compression unit 50. The instantaneous compression unit 50 is made up of a conversion table 52 for effecting instantaneous compression and a DMA controller 51.

The DMA controllers 131, 51 perform arbitration for the main bus 10 for DMA transferring the compressed picture data and the instantaneously compressed expanded picture data between the main memory 12 and the picture expansion decoder 13 by exploiting the vacant time of the main bus 10. The FIFO memories 132, 135 are buffers of a minimum number of steps for preventing data from being lost on collision of plural bus requests.

The MDEC 133 expands the picture data, compressed in accordance with the MPEG2 system, by way of data expansion.

Before proceeding to the description of the decoding for expansion by the MDEC 133, the manner in which the picture data is recorded in a compressed form on the CD-ROM 6 is explained by referring to the block diagram of FIG. 4 showing the case of texture pattern picture data.

Figures 5, 6:
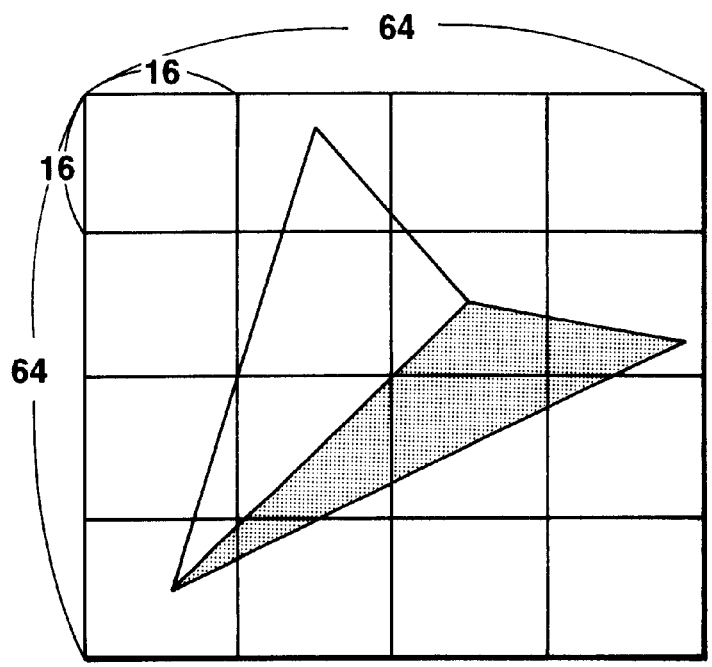
FIG. 5 illustrates an original picture and a processing unit therefor in an embodiment of the present invention.
FIG. 6 illustrates ancillary data used for processing the picture of FIG. 5.

In the present example, the texture pattern data is the two-dimensional picture data of a rectangular area made up of 64 pixels by 64 pixels, as described above. Each pixel data is made up of 8 bits each of the red (R), green (G) and blue (B). It is noted that a pixel allocated to (R, G, B)=(0, 0, 0) is allocated so as to be construed as being of a transparent color. FIG. 5 shows an example of an original high-quality texture pattern obtained on pre-rendering.

The texture-pattern original data entering an input terminal 101 in FIG. 4 is split in a block splitting unit 102 into 16 rectangular areas each made up of 16 by 16 pixels, as shown in FIG. 5. This rectangular area is termed a macro-block. Downstream of the block splitting unit 102, the texture-pattern data are processed on the macro-block basis.

In the present embodiment, the block splitting unit 102 previously removes those of the 16 macro-block for which the pixel values are all of a transparent color, and packs the remaining macro-blocks to output the resulting packs. Simultaneously, a table Ptb specifying the position information of the macro-blocks in the texture pattern is generated in the block splitting unit 102 and supplied to a recording signal generating unit 108 so as to be recorded as a part of the header information which is an ancillary information of the texture-pattern data.

Figure 7:
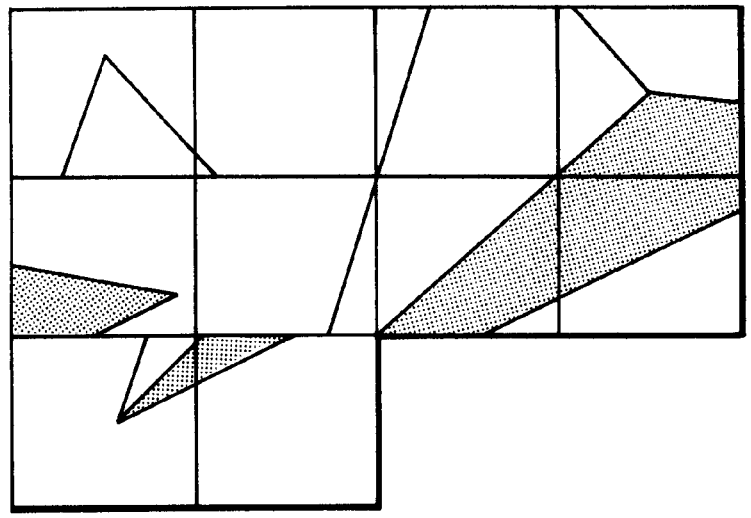
FIG. 7 illustrates data when recording the original picture of FIG. 5.

If the texture pattern is as shown in FIG. 5, the position table Ptb of the macro-block is as shown in FIG. 6. That is, the position table Ptb of the macro-blocks is a 4×4×1 bit table in which '0' and '1' are accorded to a position of a macro-block made up only of transparent color pixels and to a position of a macro-block where there exists at least one opaque pixel. In the case of the present embodiment, the texture pattern output picture data, packed after removal of the macro-blocks the pixel values of which are all of a transparent color, are made up of ten macro-blocks, as shown in FIG. 7.

The packed texture pattern data are sent to a compression unit 103 where each macro-block is converted from a representation of three-color signals into one made up of luminance signals and chroma signals. This representation is hereinafter termed color space conversion (CSC). Table 1 shows examples of the CSC coefficients used in this case, to convert a three color signal to a luminance and control signal.

TABLE 1

$$\begin{bmatrix} Y \\ Cb \\ Cr \end{bmatrix} = \begin{bmatrix} 0.299 & 0.587 & 0.114 \\ -0.16871 & -0.33130 & -0.5 \\ 0.5 & -0.4187 & -0.0813 \end{bmatrix} \times \begin{bmatrix} R \\ G \\ B \end{bmatrix}$$

Figure 8:
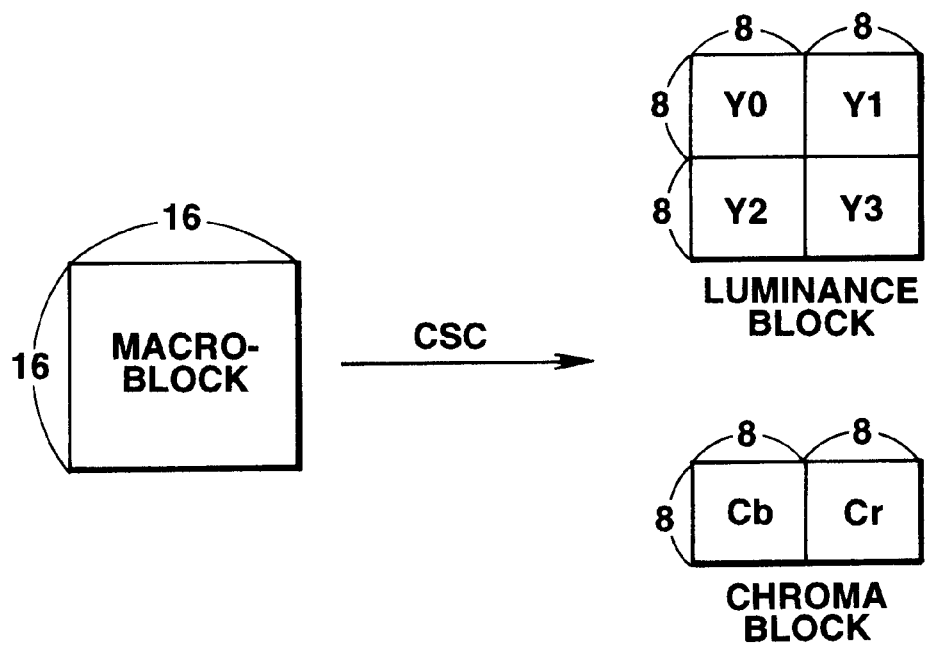
FIG. 8 illustrates a processing unit of compressed picture data in an embodiment of the present invention.

As for the luminance signal components, each macro-block is split into four so that it is made up of 4 luminance blocks Y0, Y1, Y2 and Y3, each made up of 8 by 8 pixels, as shown in FIG. 8. As for a macro-block made up of chroma signal components, neighboring four pixels are grouped together to form two chroma signal blocks each consisting of 8 by 8 pixels. In this manner, each macro-block is split into six blocks.

The compression unit 103 applies a discrete cosine transform (DCT) to this macro-block. The DCT is a sort of similar transform termed orthogonal transform, and denotes transform defined by a form $$Y + P \cdot X \cdot Pi$$

where a matrix of 8 by 8 pixels having luminance values of the block as components, P is a DCT matrix, and Pi denotes its inverse matrix. The coefficients of the DCT matrix P are as shown in Table 2.

TABLE 2

$$P = \begin{bmatrix} 4096 & 4096 & 4096 & 4096 & 4096 & 4096 & 4096 & 4096 \\ 5681 & 4816 & 3218 & 1130 & -1130 & -3218 & -4816 & -5681 \\ 5532 & 2217 & -2217 & -5352 & -5352 & -2217 & 2217 & 5352 \\ 4816 & -1120 & -5681 & -3218 & 3218 & 5681 & 1130 & -4816 \\ 4096 & -4096 & -4096 & 4096 & 4096 & -4096 & -4096 & 4096 \\ 3218 & -5681 & 1120 & 4816 & -4816 & -1130 & 5681 & -3218 \\ 2217 & -5352 & 5352 & -2217 & -2217 & 5352 & -5352 & 2217 \\ 1130 & -3218 & 4816 & -5681 & 5681 & -4816 & 3218 & -1130 \end{bmatrix} \times 1/64$$

The DCTed blocks are quantized with a resolution different from one component to another. A table designating a quantization width from one component to another is termed a quantization table (Q-table). An example of the quantization table is shown in the quantization Table 3.

TABLE 3

$$Qtab = \begin{bmatrix} 2 & 16 & 19 & 22 & 26 & 27 & 29 & 34 \\ 16 & 16 & 22 & 24 & 27 & 29 & 34 & 37 \\ 19 & 22 & 26 & 27 & 29 & 34 & 34 & 38 \\ 22 & 22 & 26 & 27 & 29 & 34 & 37 & 40 \\ 22 & 26 & 27 & 29 & 32 & 35 & 40 & 48 \\ 26 & 27 & 29 & 32 & 35 & 40 & 48 & 58 \\ 26 & 27 & 29 & 34 & 38 & 46 & 56 & 69 \\ 27 & 29 & 35 & 38 & 46 & 56 & 69 & 83 \end{bmatrix} \times 1/16$$

In actuality, quantization is carried out by dividing the value of the Q-table for each component by the product of a value QUANT which determines the overall quantization step.

If the overall quantization step QUANT is increased, the as-decoded picture is deteriorated in quality. However, the number of 0-components in a block is increased, thus improving the compression rate.

The quantized block is numbered one-dimensionally by a sequence termed a zigzag order so as to be then variable-length encoded by Huffman encoding. The compressed picture data from the compression unit 103 is sent to a recording signal generating unit 109.

The packed texture-pattern picture data from the block division unit 102 is also sent to a mask pattern generating unit 104. For each packed macro-block pattern, an α-pattern (mask pattern) of 16×16×1 bits, in which a bit associated with a transparent color becomes 1, is provided and routed via a mask pattern buffer 105 to the recording signal generating unit 109.

Figure 9:
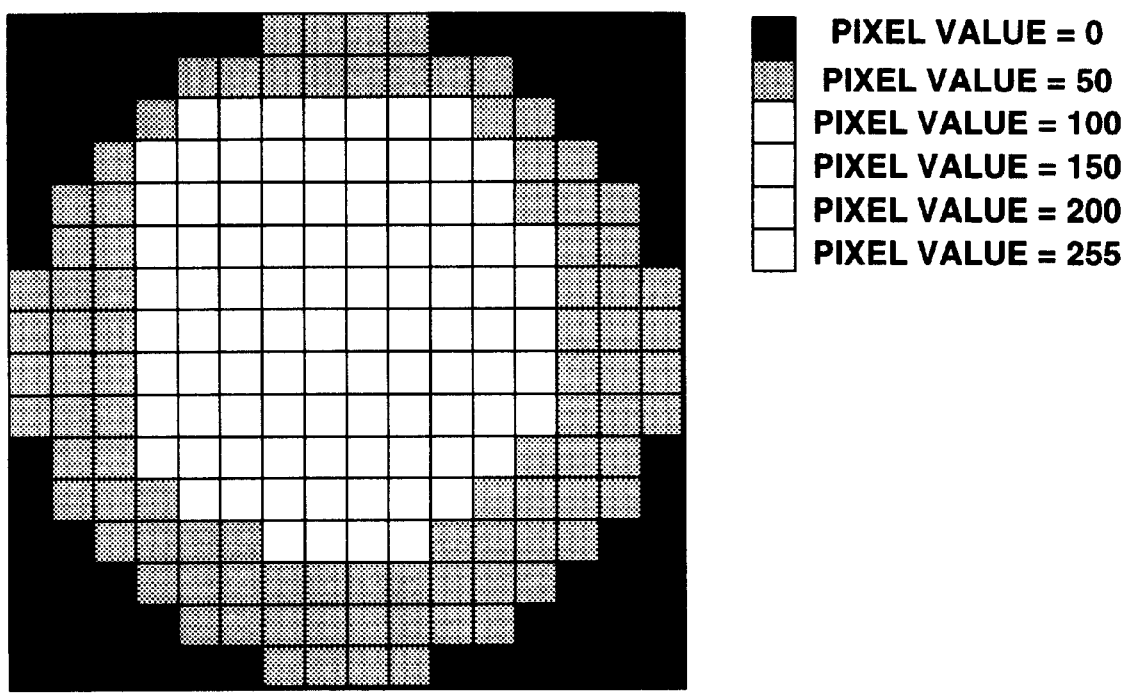
FIG. 9 illustrates an example of the original picture pattern of a processing unit of compressed picture data in an embodiment of the present invention.

If a macro-block of a texture pattern has a pattern as shown in FIG. 9, the mask pattern Msk of the macro-block is shown n FIG. 10. Shown on the right side of FIG. 9 are level values when the pixel values are represented by 8 bits. The pixel value=0 corresponds to the pixel values of the three prime colors (R, G, B)=(0, 0, 0) meaning transparency, as explained previously. The data of the mask pattern Msk is 16×16×1 bit data where '0' and '1' for a transparent pixel and for an opaque pixel, respectively.

In the present embodiment, a color lookup table (CLUT) for performing index color data processing is generated and data of the CLUT thus generated are recorded in the CD-ROM 6. The macro-bock based picture data from the block splitting unit 102 are sent to a CLUT generator 106 which then selects representative colors used for the macro-block by vector quantization from one macro-block to another. The CLUT made up of the representative colors and the index as shown in FIG. 11 is generated.

As the technique for vector quantization by the CLUT generating unit 106, such a method is used in which three prime color signal components of red(R), green (G) and blue (B) are taken in mutually orthogonal directions for supposing a three-dimensional space, the distances between respective pixels in the color space are found, the pixels with shorter distances are grouped together and the pixel data are rounded so that the colors of the pixels in a macro-block will be compressed within 16 representative colors. Of course, a variety of known vector quantization techniques may be used in addition to the above-described method. If, in the present embodiment, the pixels of the transparent color are included in a macro-block, one of the representative colors needs to be a transparent color, without regard to the particular vector quantization method used.

If the pixel data can be rounded to 16 or less representative colors in this manner, the color lookup table (CLUT) made up of the 10 or less representative colors and the index of each of the representative colors is formulated. The CLUT, thus formulated, is sent via a CLUT buffer 107 to the recording signal generating unit 108.

Figure 12:
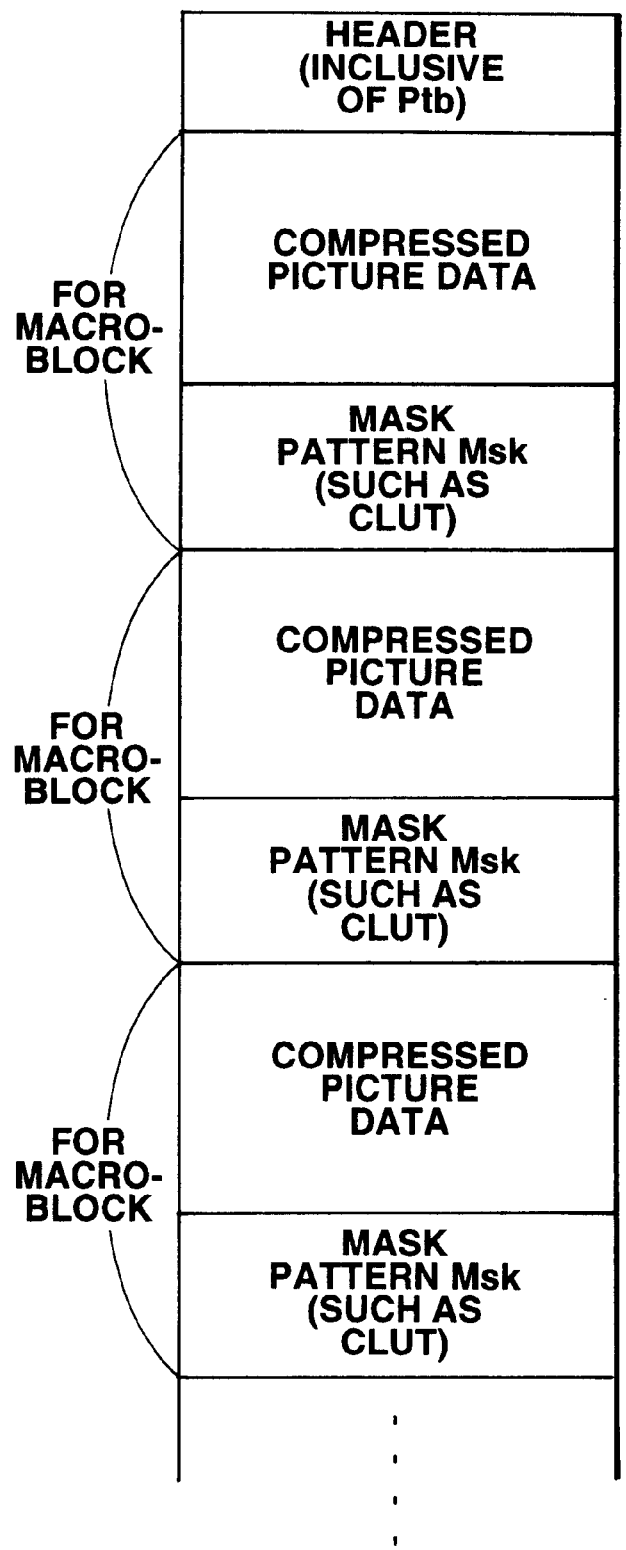
FIG. 12 illustrates an example of a data format during recording of compressed picture data in an embodiment of the present invention.

The recording signal generating unit 108 groups the above results on the macro-block basis for writing in the CD-ROM 6 via a writing unit 109. In this case, the data format is such that the macro-block based compressed picture data is followed by the mask pattern Msk for the macro-block and CLUT data, as shown in FIG. 12. This data is. termed a bitstream. A series of sets of the macro-block based compressed picture data and mask pattern data make up 64 by 64 pixel texture-pattern data which is recorded in a CD-ROM 6. The header information is appended at the leading end of each texture pattern data. In the header information, not only the identification data testifying to data being the texture pattern data, but also the macro-block position table Ptb specifying the information on the macro-block position in the texture pattern as described above with reference to FIG. 6, are recorded as part of the header information.

The sequence of the expansion decoding of the picture data, recorded in the compressed form in the CD-ROM 6 as described above, is the reverse of the above-described sequence of picture compression. Since the compression in this case is irreversible, the picture expansion decoding unit 13 uses the mask pattern Msk recorded after interleaving on the compressed data of the pixel values for compulsorily converting the decoded pixels of the bit '0' of the associated mask pattern Msk into a transparent color for correctly decoding the transparent color pixels of the expanded macro-block, as also will be explained subsequently.

An MDEC 133 of the picture expanding/decoding unit 13 performs in the following manner:

(1) In the CD-ROM 6, there are recorded the compressed picture and the ancillary information (such as geometry information) in the interleaved state. These items of the information are continuously read out by the CD-ROM driver 42 and the CD-ROM decoder 41 for temporary storage in the main memory 12. Then, only the compressed picture information is sliced and transferred to the picture expansion decoding unit 13. The mask pattern Msk is appended to the compressed picture information. Meanwhile, the ancillary information, such as the geometry information, is processed by the CPU 11 for computing the position information of an object in which the defrozen picture is used as a texture.

(2) The MDEC 133 has a variable length decoder and decodes a Huffman-encoded block. Although the tree of the Huffman is fixed, the values of the associated codes an be changed.

(3) The MDEC 133 also has a dequantizer which dequantizes the decoded block for changing the block sequence to the above-mentioned zigzag order. The dequantization is carried out at the steps different on the coefficient basis.

(4) The MDEC 133 also has a CSC processing unit which performs inverse orthogonal transform of 8×8 pixels.

(5) The MDEC 133 also has a CSC processor which converts the macro-block picture represented by the luminance signals and the chroma signals into a representation of three prime color signals R, G and B.

Thus, of the input data transferred from the subsidiary storage unit 27 to the main memory 12, the compressed picture data is transferred by the DMA controller 131 from the main memory 12 to the picture expansion decoding unit 13, in which the MDEC 133 effects decoding associated with the MPEG 2 for defreezing the compressed picture data for decoding the respective pixels as direct color form picture data made up of the three prime color signals R, G and B as described above.

These picture data are supplied to a packer 134 configured for packing the expanded and decoded picture data in a form suited to the drawing processor 15 on the pixel basis. In the present embodiment, the output form of the picture data sent to the drawing processor 15 can be set to the direct color system or to the index color system. It is the packer 134 that performs conversion of the output form. This packer 134 converts compulsorily opaque pixels to transparent pixels using the mask pattern Msk about the pixels included in the macro-block, regardless of changing the transparent pixel to an opaque pixel by the irreversible encoding/decoding.

Figure 13:
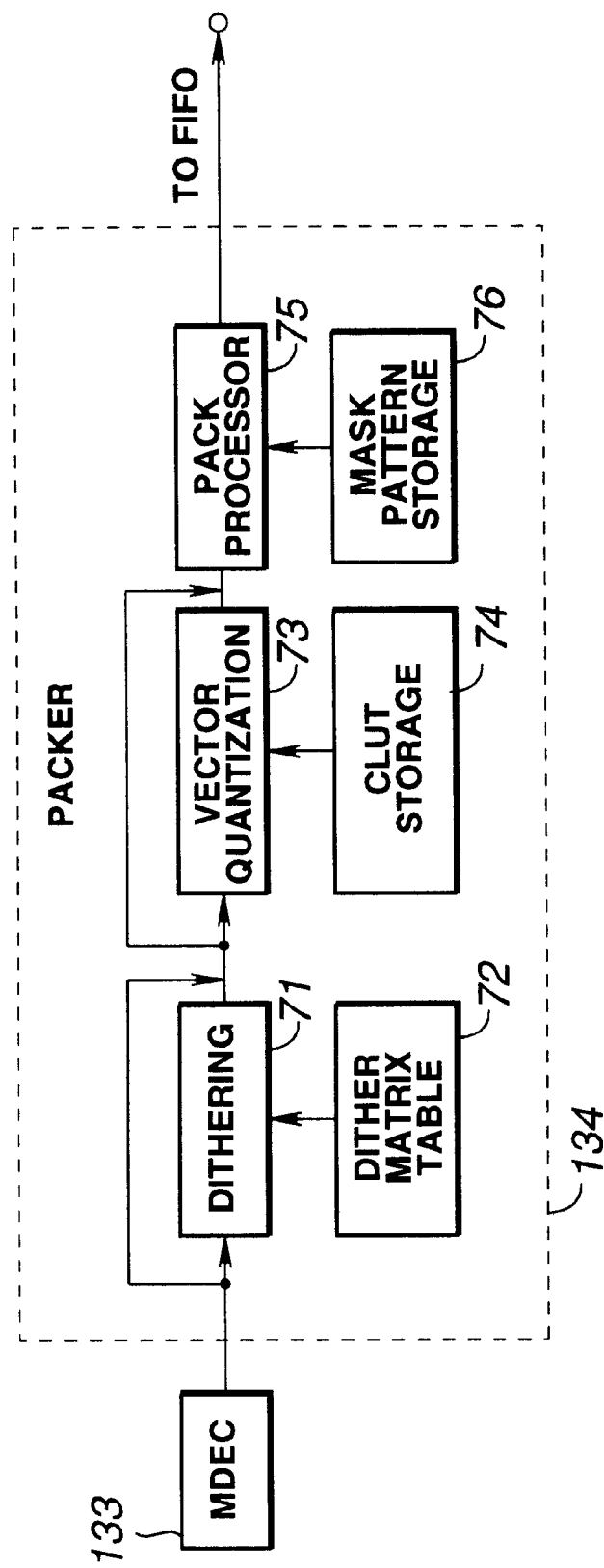
FIG. 13 is a block diagram for illustrating handling of data during recording of the compressed picture data, in an embodiment of the present invention.

The packer 134 has the configuration as shown in FIG. 13. specifically, the packer 134 has a dithering unit 71 for performing dithering based on a dither matrix table 72, a vector quantizer 73 for grouping the pixel data in representative colors of the CLUT provided in a CLUT storage unit 74, to convert data of direct color form to data of index color form whenever outputting output data in the index color form, a pack processor 75 and a mask pattern storage unit 76 for storage of the mask pattern Msk.

The macro-block based CLUT, appended in an interleaved state on the texture pattern picture data, is transferred from the main memory 12 to the CLUT storage unit 74 for storage therein. Similarly, the macro-block based mask pattern Msk, appended in an interleaved state on the texture pattern picture data, is transferred from the main memory 12 to the mask pattern storage unit 76 for storage therein. Meanwhile, the CLUT and the mask pattern Msk may also be transferred directly to the storage units 74 or 76 without being passed through the main memory.

The packing processor 75 packs the decoded data on the pixel basis to output the packed data. At this time, the operation of compulsorily converting the expanded data of the transparent pixel in the pre-compression texture picture into values of transparent colors is carried out, using a mask pattern Msk stored in the mask pattern storage unit 76.

Figure 14:
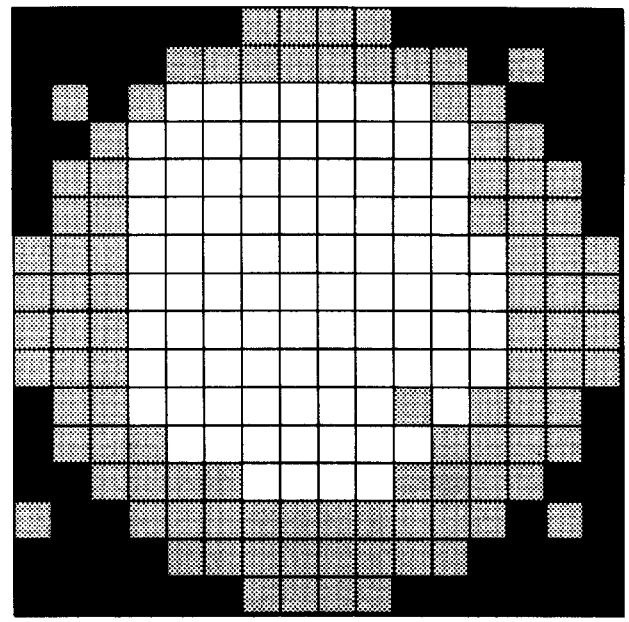
FIG. 14 illustrates the noise generated in picture data by irreversible compression.
Figure 15:
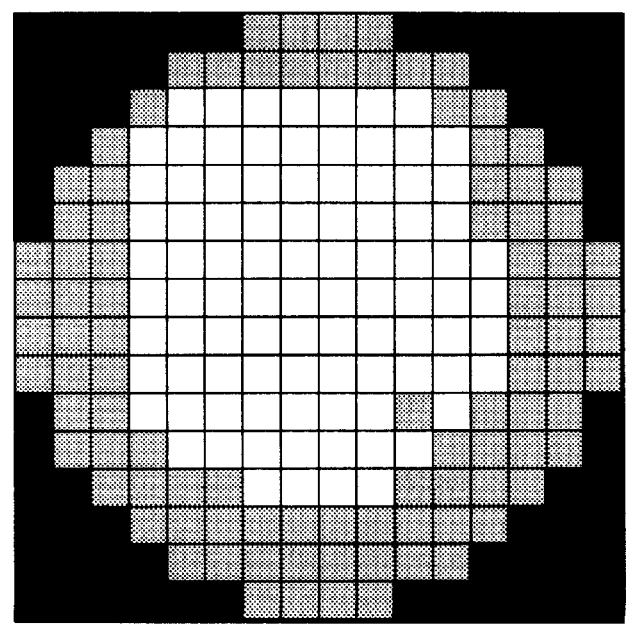
FIG. 15 illustrates a picture pattern after removing the noise generated by irreversible compression, in an embodiment of the present invention.

It is now assumed that, for example, if the original pre-compression macro-bock pattern is such as is shown in FIG. 9 and the mask pattern Msk is as shown in FIG. 10, the pattern of the expanded and decoded macro-block pattern has been expanded as by the irreversible encoding/decoding by the MPEG2 so that the transparent pixel has been expanded as an opaque pixel, as shown in FIG. 14.

In this case, the macro-block data as shown in FIG. 14 enters the pack processor 75, while the mask pattern Msk shown in FIG. 10 is stored in the mask pattern storage unit 76. There-fore, the pack processor 75 converts the pixel which is '0' in the mask pattern Msk of FIG. 10 into (R, G, B)=(0,0,0) specifying the transparent color without regard to the pixel values of the expanded input picture data. In this manner, the pack processor 75 outputs expanded picture data in which the pixels with an inherently transparent color are all correctly set to the transparent color.

If the expanded picture data is outputted from the packer 134 in the direct color form, and the number of bits of the input pixel is equal to that of the output pixels, the dithering unit 71 and the vector quantizer 73 are by-passed and the decoded data are outputted after being packed by the packing processor 75 on the pixel basis.

If the expanded picture data is outputted in the direct color form, but if the number of bits n of the output pixels is smaller than that of the input pixels, the dithering unit 71 performs suitable rounding. In the present embodiment, 16-bit signed fixed decimal point decoded data is obtained by the MDEC 133. In the present embodiment, one of the following three rounding processing operations is used.

a) The input pixels are clipped so as to be comprised within N bits, after which lower n bits of an integer part of the input pixel values are outputted;

b) the upper(N+1) bits of the input pixel are truncated by half-adjustment and upper N bits are outputted; or c) the input pixel is multiplied with an ordered dither of a fixed dither matrix table 72, the upper(N+1) bits are truncated by half-adjustment and upper N bits are outputted.

Then, in outputting in the index color system, the inverse vector quantization employing the representative colors stored in the CLUT storage unit 74 as shown in FIG. 11 is performed by the vector quantizer 73 for outputting index data of the representative color in place of each pixel value.

As a technique for vector quantization, the values of the expanded-deced ixels (color data of, for example, 8 bits, for each of the color components of the three prime colors of R, G and B), are compared to the 16 representative colors given as CLUT (made up of, for example, four bits for each of the three prime colors of R, Gand B) and the index of the color data of the CLUT 74 with closer color affinity is outputted in place of the pixel value.

Figure 16:
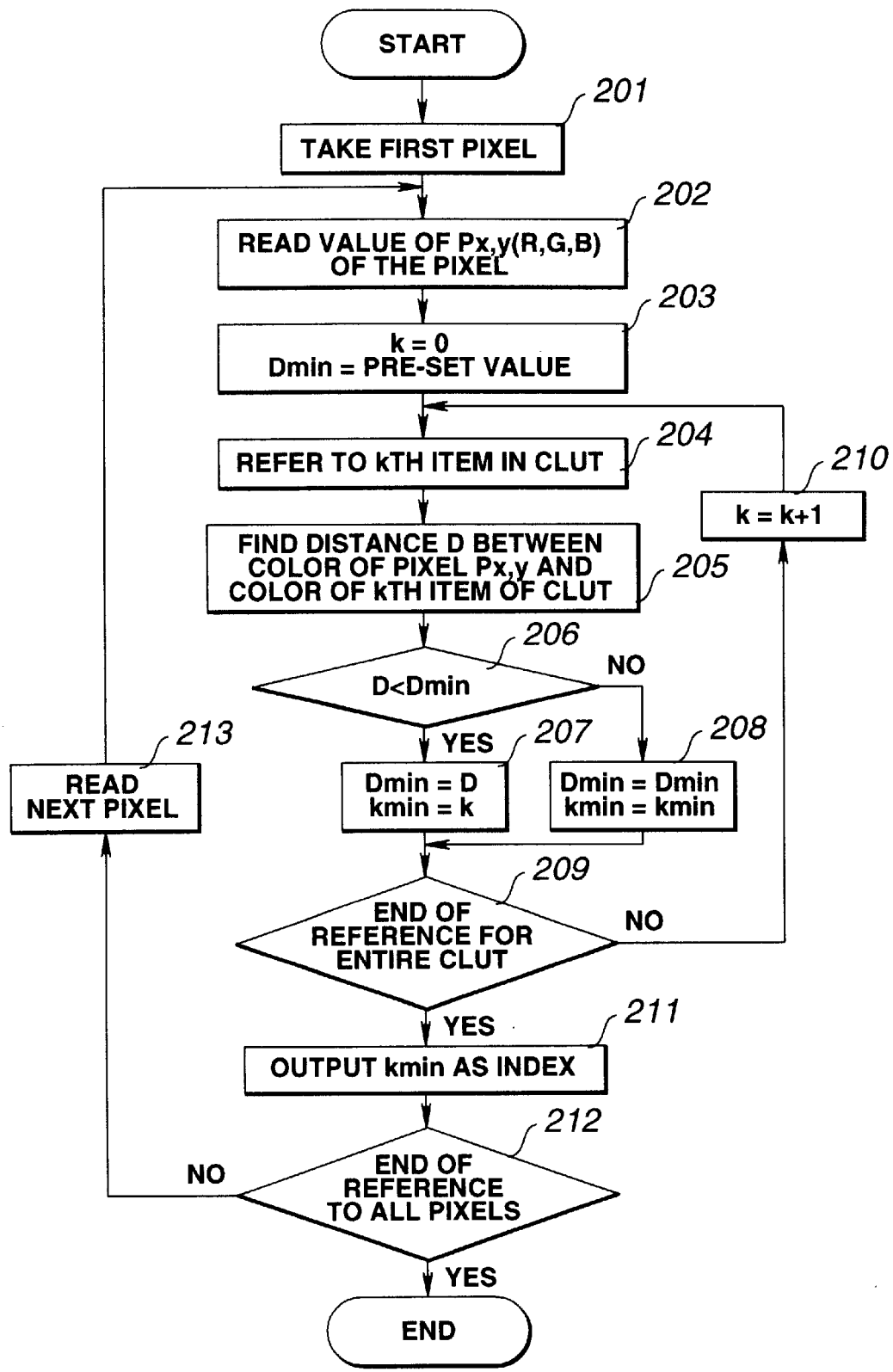
FIG. 16 is a flowchart for conversion to an index color form data.

FIG. 16 is a flowchart showing the processing operation by the vector quantizer 3.

First, at step ST201, the first pixel of data of the expanded and decoded macro-block are taken out. At the next step 202, the pixel values (R, G and B) of the pixel Px,y are read. The next step is initialization for vector quantization. For this initialization, a pointer k (=the index number in FIG. 11) of a reference column of the CLUT is set to an initial value, while the minimum value Dmin of the distance D between the representative color data of the CLUT and the pixel values of the pixels Px,y, that is the distance between R, G and b on the color space or the degree of color similarity) is set to a pre-set value.

Then, processing transfers to step 204 to refer to the representative color data of the CLUT specified by the pointer k. Then, at step 205, the distance D between the pixel Px,y and the representative reference color data is found.

In this case, the distance D between two colors (R1, G1, B1) and (R2, G2, B2) may be calculated by the following equation:

$$D=(R1-R2)*(R1-R2)+(G1-G2)*(G1-G2)+(B1-B2)*(B1-B2) \quad (Q1)$$

in which * denotes multiplication.

At the next step 206, the distance D as found is compared to the minimum distance Dmin. If the distance as found D is smaller than the minimum distance Dmin as found so far, the distance as found D is substituted for the minimum distance Dmin, while a pointer value k of a column of the representative color is substituted for the index value to be found kmin at step 207. Conversely, should the distance D be larger than the minimum distance Dmin as found so far, processing transfers to step 208 where the prevailing values of the minimum distance Dmin and the index value kmin to be found are maintained.

After the steps 207 and 208, processing transfers to step 209 for determining whether or not reference has been made to all of the representative colors of the CLUT. If there is any representative color not referred to as yet, processing transfers to step 210 for incrementing the value of the pointer k. Processing then reverts to step 204 for repeating the operation from step 204 up to step 209.

If it is determined at sep 209 that reference to all representative colors of the CLUT has come to a close, processing transfers to step 211 where the index value kmin is outputted as data for the pixel. Then, processing transfers to step 212, where it is checked whether or not the conversion the index data employing the above CLUT for all pixels in the macro-block has come to a close. If there is any next pixel for which the above conversion has not come to a close, processing transfers to step 213 to read out the next pixel. The, processing reverts to step 202 in order to perform the above processing for the pixel. If it is judged that the processing for all pixels in the macro-block has come to a close, processing of the next macro-block is started.

In this manner, the compansion decoding unit 13 converts the 14-bit pixel value after expansion and decoding into 4-bit index data in the index system, and outputs the resulting compressed data. Of course, data of the mask pattern Msk or the CLUT data are not included in the expanded output picture data.

The pixel data packed in this manner by the packer 134 are sent via the FIFO memory 135 to the instantaneous compression unit 50 where the picture data are compressed instantaneously. In distinction from the high-efficiency compression of MPEG2, the instantaneous compression has a compression efficiency of ¼ to ½. However, such instantaneous compression is used in which reversible compression/decoding can be realized by a compression/decoding circuit having a smaller hardware scale despite the low compression ratio of ¼ to ½.

In the present embodiment, run-length coding and Huffman coding are used simultaneously for compression. A conversion table 52, as a codebook functioning as a dictionary for compression, is provided in the instantaneous compression unit 50. The conversion table 52, as the code book, is previously generated and maintained.

The instantaneous compression unit 50 functionally has the DMA controller 51, as shown, and transfers the MPEG expanded/decoded picture data to the main memory 12 as it simultaneously effects run-length encoding and Huffman encoding using the conversion table 52. The above is the operation of the picture expansion-decoding unit 13. In this case, since the compressed data is the picture data to which is given a specified value as a transparent color, it is unnecessary to store the α-plane representing the transparency in the main memory 12, so that the memory capacity may be correspondingly reduced. In addition, since the compressed data is stored in the main memory 12 by the instantaneous compression unit 50. Moreover, since the compressed data is stored in the present embodiment by the instantaneous compression unit 50, the data volume may be reduced.

Meanwhile, if motion compensation is performed, instantaneous reversible compression by the instantaneous compression unit 50 is not performed. In this case, the picture expansion decoding unit 13 when reading in the bitstream simultaneously reads in the picture data of the previous frame developed on the main memory 12 for processing.

By sequentially drawing polygons constituting faces of an object beginning from a polygon lying at a remote position along the direction of depth in accordance with Z-data representing the three-dimensional depth information, a picture can be stereoscopically displayed on a two-dimensional picture display surface.

The main CPU 11 calculates an object or the motion of a viewing point, based on a user input from the control pad of the input unit 26, and formulates a polygon drawing command string on the main memory 12.

This picture drawing command string, if completed, is transmitted by the main DMAC 16 from the pre-processing unit 14 from the main memory 12 to the picture drawing processing unit 15 from one drawing command to another.

The picture drawing processing unit 15 sequentially executes the data sent thereto for storage of the results in a picture drawing area of the frame memory. For drawing the polygon, the data are sent to a gradient calculation unit of the picture drawing unit 15 for calculating the gradient. The gradient calculations are the calculations of finding the gradient of the plane of the mapping data in the course of burying mapping data in the inside of the polygon by polygon drawing. If a texture is drawn, the polygon is filled with the texture picture data, whereas, in the case of glow shading, the polygon is filled with luminance values.

Processing the texture of a moving picture is also possible. That is, in the case of the texture of the moving picture, compressed moving picture data from the CD-ROM 6 is transiently stored in the main memory 12. The compressed picture data is sent to the picture expanding decoding unit 13. The picture expanding decoding unit 13 expands the picture data.

The expanded moving picture data is sent to a texture area on the frame memory of the drawing processor 15. Since the texture area is provided in the frame buffer of the drawing processor, the texture pattern itself can be re-written on the frame basis. Thus, if a moving picture is sent to a texture area, the texture is dynamically rewritten from frame to frame. By the moving picture of the texture area, the texture of the moving picture can be realized by texture mapping to the polygon.

At a time point when a pre-set amount of the expanded macro-block based picture data are stored in the main memory 12, the main CPU 11 causes the expanded data to be transmitted over the main bus 10 to the frame buffer of the drawing processor 15 via the instantaneous defreezing unit 60 and the re-processor 14. If the expanded picture data is transmitted to the picture memory area of the frame buffer, it is directly displayed as the background moving picture on the picture monitor device. If the picture data is transmitted to a texture area of the frame buffer, the picture data of the texture area is used as a texture image for mapping to a polygon.

The instantaneous defreezing unit 60 is made up of a DMA controller 61, as a functional block, and a conversion table 62 for performing inverse conversion of the conversion performed by the conversion table 52 of the instantaneous compression unit 50. Specifically, the instantaneous defreezing unit 60 defreezes the instantaneously compressed picture data from the main memory 12, using the conversion table 62, to form MPEG expansion-decoded picture data, which is supplied via pre-processor 14 to the drawing processor 15.

If, in the present embodiment, the output form is of the direct color form, picture data of pixels the data of which is made up of three prime color signal of R, G and B of a designated pre-set number of bits are sent from the pre-processor 14 to the drawing processor 15 for executing the processing for drawing.

In the case of the index color form, the above-mentioned index data are supplied to the drawing processor 15. The CLUT which is the same as that stored in the CLUT storage unit 74 is transferred to and stored in the drawing processor 15. The drawing processor 15 converts the picture data of the index color form into corresponding representative color data, using the CLUT, for restoring the picture data. The drawing processor 15 then executes the drawing processing using the restored picture data.

In performing the texture mapping using the above-described texture pattern, the drawing processor 15 also performs the drawing processing so that the opaque pixels neighboring to a transparent pixel will be drawn to a semi-transparent color.

Figure 17:
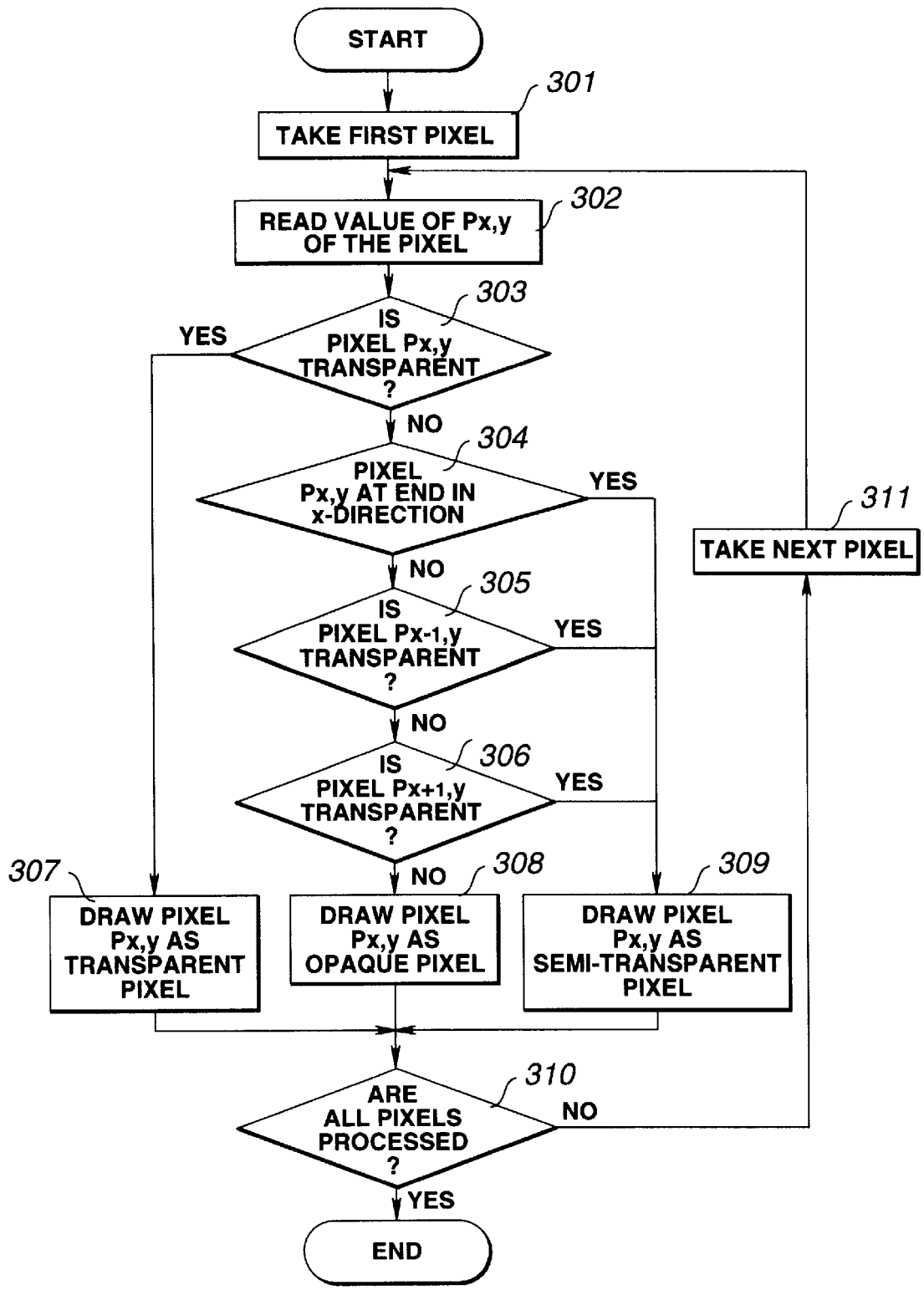
FIG. 17 is a flowchart for drawing processing including semi-transparent processing.

FIG. 17 shows, in a flowchart, an example of semi-transparent processing executed by the drawing processor 15.

Specifically, at step 301, the first pixel of the macro-block data is taken out. At the next step 302, the pixel values of the pixels Px,y are read. In the case of the index data, this pixel value is the representative color data obtained from the CLUT. Then, at step 303, it is checked whether or not the pixel is transparent. The decision as to whether or not the pixel is transparent is given depending on whether the pixel value is of a pre-set transparent color (R, G, B)=(0,0,0).

If the pixel Px,y is transparent, the drawing processor 15 proceeds to step 307 where the pixel Px,y is drawn as being a transparent pixel. That is, the pixel data at the position of the pixel Px,y in the frame buffer is not rewritten, but is kept as the background color.

If, at step 303, the pixel Px,y is found to be opaque, processing transfers to step 304 for checking whether or not the pixel Px,y is the end pixel in the horizontal direction of a macro-block. If the pixel is the end pixel, processing transfers to step 309 for drawing the pixel as being a semi-transparent pixel. That is, the pixel data at the position Px,y of the frame buffer is a 1:1 mixture of the background color and the color of the pixel Px,y.

If, at step 304, the pixel Px,y is found not to be an end pixel in the horizontal direction of a macro-block, processing transfers to step 305 for judging whether or not the pixel Px–1,y forwardly neighboring to the pixel Px,y in the horizontal direction is transparent. If the pixel Px–1,y is transparent, processing transfers to step 309 for drawing the pixel Px,y as being a semi-transparent pixel. Thereafter processing transfers to steps 310 and 311.

If it is found at step 305 that the pixel Px–1,y is not transparent, processing transfers to step 306. At step 306, it is checked whether or not the pixel Px+1,y backwardly neighboring to the pixel Px,y in the horizontal direction is transparent. If the pixel Px+1,y is transparent, processing transfers to step 309 for drawing the pixel Px,y as being a semi-transparent pixel. Thereafter processing transfers to steps 310 and 311.

If, at step 306, the pixel Px−1,y is found to be non-transparent, the two pixels horizontally neighboring to the pixel Px,y are both opaque, so that processing transfers to step 308 for drawing the pixel Px,y as being opaque pixels. That is, the value of the corresponding pixel is rewritten to the value of the pixel Px,y. Thereafter processing transfers to steps 310 and 311.

In step 310, it is determined whether or n6t all of the pixels included in the macro-block have been processed. If all pixels are not processed yet, processing transfers to step 311. In step 311, the next pixel included in the macro-block is taken, thereafter step 302 is returned and the same operation described above is repeated. On the other hand, if all pixels have been processed, this operation is complete.

Figure 18:
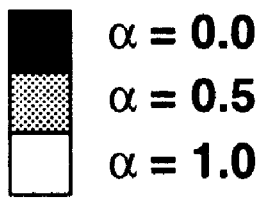
FIG. 18 illustrates semi-transparent processing.
Figure 18:
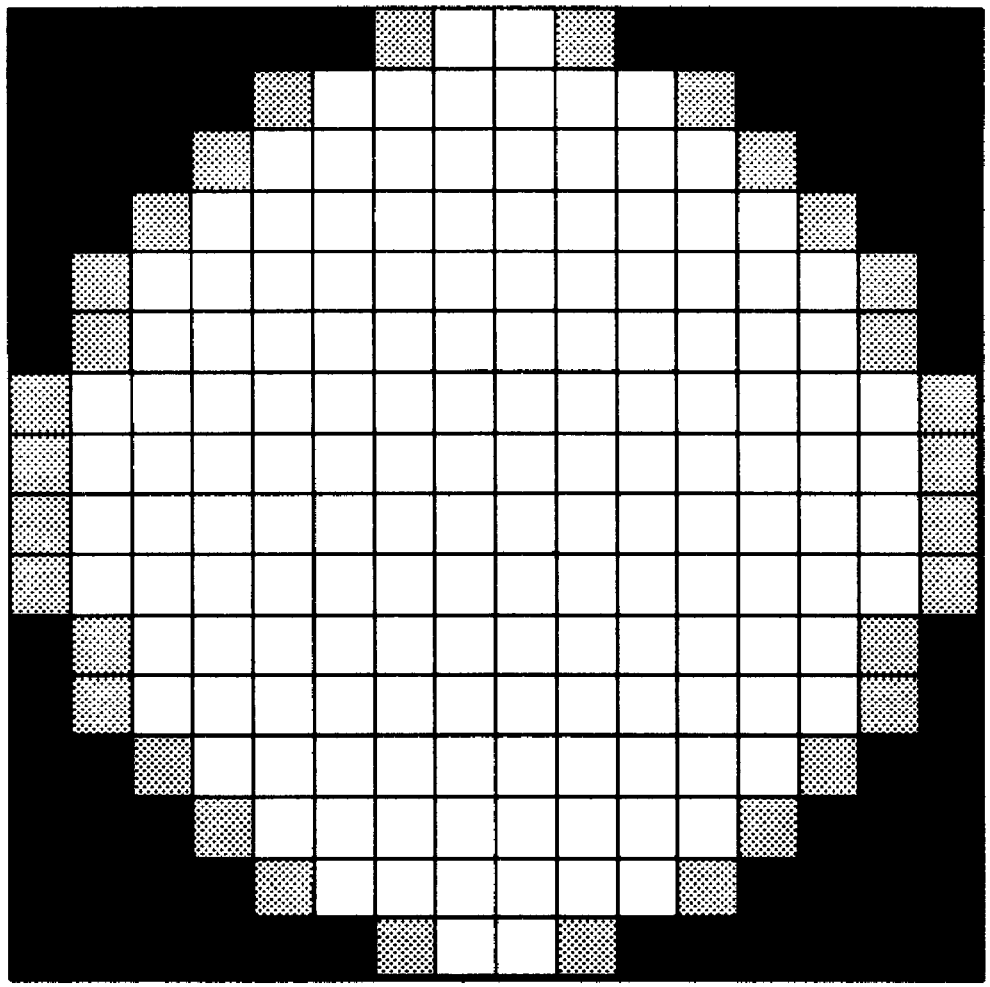

If the mixing ratio of the pixel Px,y is $\alpha$, $\alpha=0.0$, $\alpha=0.5$ and $\alpha=1.0$ specify transparent, semi-transparent and opaque drawing, respectively. FIG. 18 shows an example of the result of application of the above-mentioned semi-transparent processing to a macro-block pattern shown in FIG. 9. It is seen that the aliasing noise in texture mapping may be reduced.

In the above-described semi-transparent processing, an opaque pixel is drawn semi-transparently if solely horizontally neighboring pixels are transparent. However, reference may be had only to vertically neighboring pixels for determining whether or not the opaque pixel should be semi-transparent. Alternatively, the opaque pixel may be drawn opaquely if one of the horizontally neighboring pixel or the vertically neighboring pixel is transparent. Still alternatively, the semi-transparent processing may also be performed by having reference to obliquely neighboring pixels.

Instead of performing semi-transparent processing depending simply on whether the neighboring pixels are transparent, it is also possible to draw a first opaque pixel on transition from horizontally or vertically neighboring pixels to opaque pixels as a semi-transparent pixel or to draw a first opaque pixel on transition from neighboring opaque pixels to transparent pixels as a semi-transparent pixel.

In the above-described embodiment, in which picture data to the transparent color pixels of which a specified pixel value is given in advance is compressed to a high efficiency by an irreversible compression system, and in which a mask pattern Msk having one bit per pixel is appended as an ancillary data to the compressed picture data for recognizing the transparent color pixel and the opaque pixel, such that, on expansion of the compressed picture data, an inherently transparent pixel is compulsorily changed to a transparent pixel data using the mask pattern Msk, a transparent pixel can be correctly drawn as transparent pixel at all times.

In addition, since the $\alpha$-plane is unnecessary, the capacity of the main memory 12 can be correspondingly reduced.

Moreover, by drawing an opaque pixel neighboring to the transparent pixel as a semi-transparent pixel, the aliasing noise of contour portions of the drawn picture can be reduced.

In the present embodiment, the expanded picture data is instantaneously compressed and transferred to the main memory over main bus 10. Thus the utilization efficiency of the memory can be improved in an amount corresponding to the data compression. Moreover, if the index color form is used as an output form of the expanded picture data, the data volume is reduced because the pixel data is made up of index data, so that the data volume may be reduced and the utilization efficiency of the memory can be improved in an amount corresponding to the data compression.

The expanded picture data transmitted over the main bus 10 from the picture expansion decoding unit 13 to the main memory 12 and the expanded picture data transmitted from the main memory 12 over the main bus 10 to the drawing processor 15 are instantaneously compressed data and the data volume is reduced thus improving the bus transmission speed.

Also, in the present embodiment, the direct color form or the index color form may be selected as the output form from the picture expansion decoding unit 13, even if there is only one form of the input compressed picture data, such that there is no necessity of providing separate input picture data for achieving separate output forms, thus further improving the utilization efficiency of the ain memory.

Furthermore, in the direct color form, pixel data can be rounded by dithering to the number of bits suited to the processing by the drawing processor 15, even in the case of the direct color form, output data of a desired number of bits can be obtained easily.

Although the aforedescribed description has been made with reference to the application of the picture processing device of the present invention to a game machine, it will be noted that the picture processing device of the present invention can be used for a variety of applications.

Hence, according to the present invention, transparent pixels can always be drawn correctly as a transparent pixel. Moreover, since the ancillary data such as the $\alpha$-plane is not used for transparent drawing, there is no necessity for storing such ancillary data in a memory.

Moreover, each of the opaque pixels neighboring to the transparent pixels can be drawn as a semi-transparent pixel for reducing aliasing noise.

The CD-ROM disc as mentioned above, is made by recording the bitstream on a master disc. A stamper is then made from the master disc. Thereafter, a large number of discs to be sold are made from the stamper.

Hence, the present invention satisfies a long existing need in the art for a method and apparatus for transmitting and processing image data, and a recording medium therefor, which obviates the aforedescribed problems of image noise and the handling of pixel transparency data.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:

1. A method of picture data transmission, comprising:
   transmitting picture data in which there is allocated a value representing transparency as a pixel value, said picture data being compressed in terms of picture data corresponding to a pre-set pre-determined size of a picture area as a unit; and
   transmitting ancillary data specifying whether each pixel of the original picture data of the picture data unit is transparent or opaque in correlation
   wherein a pixel set as a transparent pixel by said ancillary data on expansion of the compressed picture data is compulsorily set as a transparent pixel without regard to the expanded picture data.

2. A processing apparatus for input picture data in the form of picture data paired with ancillary data, said picture data having an allocated value representing transparency, said picture data being compressed in terms of picture data corresponding to a pre-set pre-determined size of a picture area as a unit, said ancillary data specifying whether each pixel of the original picture data of the picture data unit is transparent or opaque, said processing apparatus comprising:

expansion decoding means for expanding the picture data from one compressed picture data unit to another; and picture correction means for compulsorily setting to a transparent pixel each such pixel set by said ancillary data as a transparent pixel for each expanded picture data from said expansion decoding means.

3. A picture processing method, comprising:

drawing a picture including transparency by picture data having a value allocated for representing transparency as a pixel value; and drawing an opaque pixel neighboring said transparent pixel as a semi-transparent pixel, whereby image noise is minimized.

4. A data processing apparatus for generating original picture data from received picture data, said picture data including encoded picture data encoding the original picture data for each picture area and additional data, each picture area being provided by dividing the original picture data, each picture area including a plurality of pixels, each such pixel having a pixel value, said additional data specifying whether each pixel value of the picture data is transparent or opaque, said apparatus comprising:

means for decoding the encoded picture data for each picture area;

means for correcting a pixel value of each pixel of the decoded picture data in accordance with the additional data for each picture area; and means for drawing the decoded original picture data;

wherein said correcting means compulsorily corrects the pixel value of the pixel as a transparent pixel whenever the additional data corresponding to the pixel specifies that the pixel is a transparent pixel.

5. A data processing apparatus for generating original picture data from received picture data, said picture data including encoded picture data encoding the original picture data for each picture area and additional data, each picture area being provided by dividing the original picture data, each picture area including a plurality of pixels, each such pixel having a pixel value, said additional data specifying whether each pixel value of the picture data is transparent or opaque, said apparatus comprising:

means for decoding the encoded picture data for each picture area;

means for correcting a pixel value of each pixel of the decoded picture data in accordance with the additional data for each picture area; and means for drawing the decoded original picture data;

wherein said additional data is generated for each picture area; and said correcting means generates a pixel value for all of pixel data included in the picture area as a transparent pixel when only additional data is received specifying that a pixel value in the pixel data is transparent.

6. A processing apparatus as set forth in claim 4 or 5, wherein said picture data is texture data.

7. A processing apparatus as set forth in claim 4 or 5, and further comprising:

means for receiving data from a color lookup table, said color lookup table having a plurality of representative colors, said color lookup table being generated for each picture area;

means for converting the decoded picture data for each picture area into a representative value using the color lookup table; and wherein said drawing means draws the decoded picture data in accordance with the representative value for each picture area.

8. A processing apparatus as set forth in claim 7, wherein said color lookup table includes a plurality of representative values and indexes, each representative value corresponding to each index;

said converting means converts picture values of the decoded picture data for each picture area into a representative value using the color lookup table and generates the index representing the representative value; and said drawing means draws the decoded picture data in accordance with the representative value corresponding to the index for each picture area, using the color lookup table.

9. A processing apparatus as set forth in claim 4 or 5, wherein said drawing means further includes means for detecting whether a pixel neighboring a pixel being considered is transparent or opaque and draws the pixel being considered as a semi-transparent pixel in accordance with the detected result.

10. A processing apparatus as set forth in claim 9, wherein said drawing means draws an opaque pixel neighboring a transparent pixel as a semi-transparent pixel.

11. In a game machine having apparatus for generating original picture data from received picture data, said picture data including encoded picture data encoding the original picture data for each picture area and additional data, each picture area provided by dividing the original picture data, each picture area including a plurality of pixels, each pixel having pixel value, said additional data specifying whether each pixel value of the picture data is transparent or opaque, the combination comprising:

a main body for the game machine;

a processing device within said main body for processing the received picture data, said processing device including:

means for decoding the encoded picture data for each picture area;

means for correcting a pixel value of each pixel of the decoded picture data in accordance with the additional data for each picture area;

means for drawing the decoded original picture data; and a control device connected to said main body via a cable, for manipulation by a user;

wherein said correcting means compulsorily corrects the pixel value of the pixel as a transparent pixel whenever the additional data corresponding to the pixel specifies that the pixel is a transparent pixel.

12. In a game machine having apparatus for generating original picture data from received picture data, said picture data including encoded picture data encoding the original picture data for each picture area and additional data, each picture area provided by dividing the original picture data, each picture area including a plurality of pixels, each pixel having pixel value, said additional data specifying whether each pixel value of the picture data is transparent or opaque, the combination comprising:

a main body for the game machine;

a processing device within said main body for processing the received picture data, said processing device including:

means for decoding the encoded picture data for each picture area;

means for correcting a pixel value of each pixel of the decoded picture data in accordance with the additional data for each picture area;

means for drawing the decoded original picture data; and a control device connected to said main body via a cable, for manipulation by a user;

wherein said additional data is generated for each picture area; and said correcting means generates a pixel value for all of pixel data included in the picture area as a transparent pixel whenever only additional data specifying that the pixel value of pixel data is transparent is received.

13. An apparatus as set forth in claim 11 or 12, wherein said picture data is texture data.

14. A data processing method for generating original picture data from received picture data, said picture data including encoded picture data encoding the original picture data for each picture area and additional data, each picture area being provided by dividing the original picture data, each picture area including a plurality of pixels, each such pixel having a pixel value, the additional data specifying whether each pixel value of the picture data is transparent or opaque, said method comprising the steps of:

decoding the encoded picture data for each picture area;

correcting a pixel value of each pixel of the decoded picture data in accordance with the additional data for each picture area; and drawing the decoded original picture data;

wherein said correcting step compulsorily corrects the pixel value of the pixel as a transparent pixel whenever the additional data corresponding to the pixel specifies that the pixel is a transparent pixel.

15. A data processing method for generating original picture data from received picture data, said picture data including encoded picture data encoding the original picture data for each picture area and additional data, each picture area being provided by dividing the original picture data, each picture area including a plurality of pixels, each such pixel having a pixel value, the additional data specifying whether each pixel value of the picture data is transparent or opaque, said method comprising the steps of:

decoding the encoded picture data for each picture area;

correcting a pixel value of each pixel of the decoded picture data in accordance with the additional data for each picture area; and drawing the decoded original picture data;

wherein said additional data is generated for each picture area; and said correcting step generates a pixel value for all of pixel data included in the picture area as a transparent pixel whenever only additional data specifying that the pixel value of pixel data is transparent is received.

16. A method as set forth in claim 14 or 15, wherein said picture data is texture data.

17. A method as set forth in claim 14 or 15, comprising the additional steps of:

receiving data from a color lookup table, said color lookup table having a plurality of representative colors, said color lookup table being generated for each picture area;

converting the decoded picture data for each picture area into a representative value using the color lookup table; and wherein said drawing step draws the decoded picture data in accordance with the representative value for each picture area.

18. A method as set forth in claim 17, wherein said color lookup table includes a plurality of representative values and indexes, each representative value corresponding to each index;

said converting step converts picture values of the decoded picture data f or each picture area into a representative value using the color lookup table and generates the index representing the representative value; and said drawing step draws the decoded picture data in accordance with the representative value corresponding to the index for each picture area, using said color lookup table.

19. A method as set forth in claim 14 or 15, wherein said drawing step further includes detecting whether a pixel neighboring a pixel being considered is transparent or opaque and draws the pixel being considered as a semi-transparent pixel in accordance with the detected result.

20. A method as set forth in claim 19, wherein said drawing step draws an opaque pixel neighboring a transparent pixel as a semi-transparent pixel.

21. A method of processing image data, comprising the steps of:

encoding said image data as pixel picture data and additional pixel transparency data; and transmitting said pixel picture data as compressed data and said additional pixel transparency data as uncompressed data.

22. A system for processing image data, comprising:

means for encoding said image data as pixel picture data and additional pixel transparency data; and means for transmitting said pixel picture data as compressed data and said additional pixel transparency data as uncompressed data.

* * * * *

UNITED STATES PATENT AND TRADEMARK OFFICE
CERTIFICATE OF CORRECTION

PATENT NO. : 6,071,193
DATED : Jun. 6, 2000
INVENTOR(S) : Masakazu Suzuoki

It is certified that error appears in the above-identified patent and that said Letters Patent is hereby corrected as shown below:

Title page, under "U.S. PATENT DOCUMENTS", add the following;
   --5,327,509   7/1994   Rich--.

Title page, after last listing under "U.S. PATENT DOCUMENTS" add a new title --FOREIGN PATENT DOCUMENTS--.

Title page, under new title "FOREIGN PATENT DOCUMENTS" add the following: --06029645   2/1994   Japan--.

Column 4, line 59, change "2", to read --20--.

Signed and Sealed this

Twenty-fourth Day of April, 2001

*Attest:*

NICHOLAS P. GODICI

*Attesting Officer*   *Acting Director of the United States Patent and Trademark Office*